(12) United States Patent
Moore et al.

(10) Patent No.: US 9,286,050 B2
(45) Date of Patent: Mar. 15, 2016

(54) METHOD AND SYSTEM FOR CONTEXT-BASED APPLICATION MANAGEMENT

(75) Inventors: Devin C. Moore, Lewis Center, OH (US); Wade P. Thompson, Moore, SC (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 274 days.

(21) Appl. No.: 13/225,375

(22) Filed: Sep. 2, 2011

(65) Prior Publication Data
US 2013/0061218 A1    Mar. 7, 2013

(51) Int. Cl.
*G06F 9/445* (2006.01)
*G06Q 30/00* (2012.01)
*G06Q 30/02* (2012.01)
*G06Q 30/06* (2012.01)

(52) U.S. Cl.
CPC .. *G06F 8/62* (2013.01); *G06F 8/60* (2013.01); *G06Q 30/0281* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 7,313,120 B2 * | 12/2007 | Ekberg et al. | 370/338 |
| 8,055,541 B2 * | 11/2011 | Boss et al. | 705/16 |
| 8,117,087 B2 * | 2/2012 | Michaelis et al. | 705/26.9 |
| 8,626,821 B2 * | 1/2014 | Brignone et al. | 709/203 |
| 2005/0058108 A1 * | 3/2005 | Ekberg et al. | 717/172 |
| 2005/0120200 A1 * | 6/2005 | Brignone et al. | 709/203 |
| 2007/0192182 A1 * | 8/2007 | Monaco et al. | 705/14 |
| 2008/0281670 A1 * | 11/2008 | Boss et al. | 705/10 |
| 2009/0241104 A1 * | 9/2009 | Amiga et al. | 717/174 |
| 2011/0071884 A1 * | 3/2011 | Michaelis et al. | 705/10 |
| 2011/0307354 A1 * | 12/2011 | Erman et al. | 717/178 |
| 2012/0036552 A1 * | 2/2012 | Dare et al. | 717/177 |
| 2012/0110568 A1 * | 5/2012 | Abel et al. | 717/178 |

OTHER PUBLICATIONS

ARINC Engineering Services, LLC. "Navstar Global Positioning System Interface Specification" Mar. 7, 2006, ARINC. IS-GPS-200 Revision D IRN-200D-001. pp. 1, 65, 85, 87, 88, and 103.*

* cited by examiner

*Primary Examiner* — Emerson Puente
*Assistant Examiner* — Erika Kretzmer

(57) ABSTRACT

An application is installed on a user device based on context information of another user device. A retail service platform determines that context information of a user device satisfies pre-defined context information, initiates installation of an application on the user device based on the pre-defined context information, and then initiates installation of the application on another user device based on a request from the (first) user device. The retail service platform determines to uninstall the application from the other user device based on a change in the context information of the (first) user device.

20 Claims, 10 Drawing Sheets

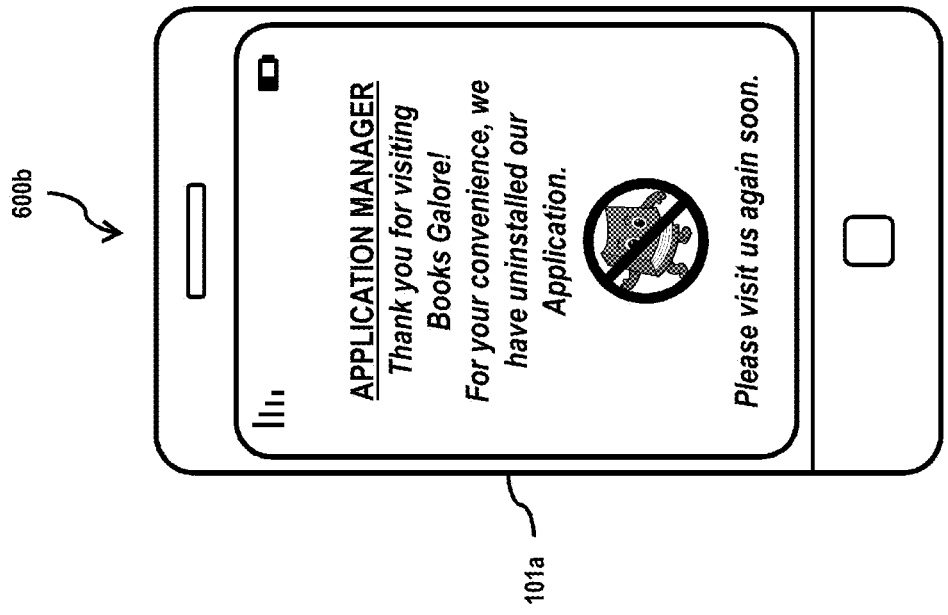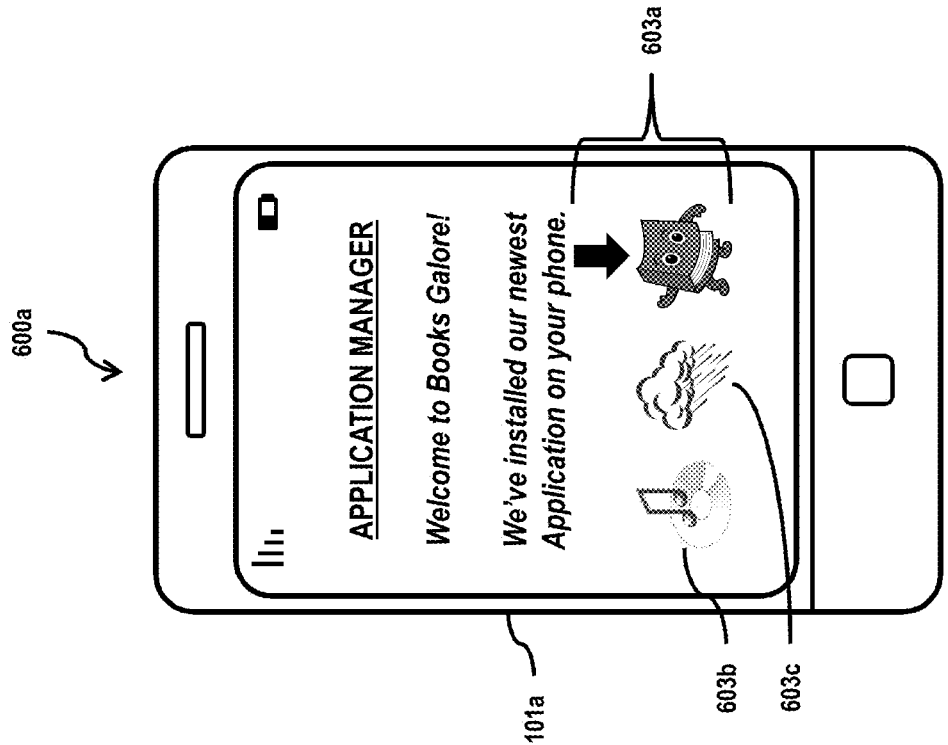

METHOD AND SYSTEM FOR CONTEXT-BASED APPLICATION MANAGEMENT

BACKGROUND INFORMATION

With the increasing popularity and functionality of mobile devices, many consumers carry on their person at least one mobile device throughout the day. Many service providers offer one or more applications that a user can download and install onto his/her mobile device that provides the consumers information tailored to the services provided by a specific service provider. By way of example, a book retailer may provide consumers with an application that allows the consumers to view books currently for sale by the book retailer. The application may also provide the consumers with the opportunity to purchase books online Further, the application may provide consumers with deals or coupons to entice the users to purchase books through the book retailer. However, service providers often rely on recommendation services to suggest the service providers' applications for downloading by consumers. That is, it is often beyond the service providers control whether these consumers ever discover and download such applications. Thus, despite a consumer being fully aware of a specific service provider, the consumer may be unaware of an application that the service provider has created to run on the consumer's mobile device Based on the foregoing, there is a need for context-based application management for providing applications to user devices based on context information of the devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 6A to 6F are diagrams of user interfaces used in executing the processes of FIGS. 3 to 5, according to an exemplary embodiment;

DESCRIPTION OF THE PREFERRED EMBODIMENT

An apparatus, method, and software for providing context-based application management, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
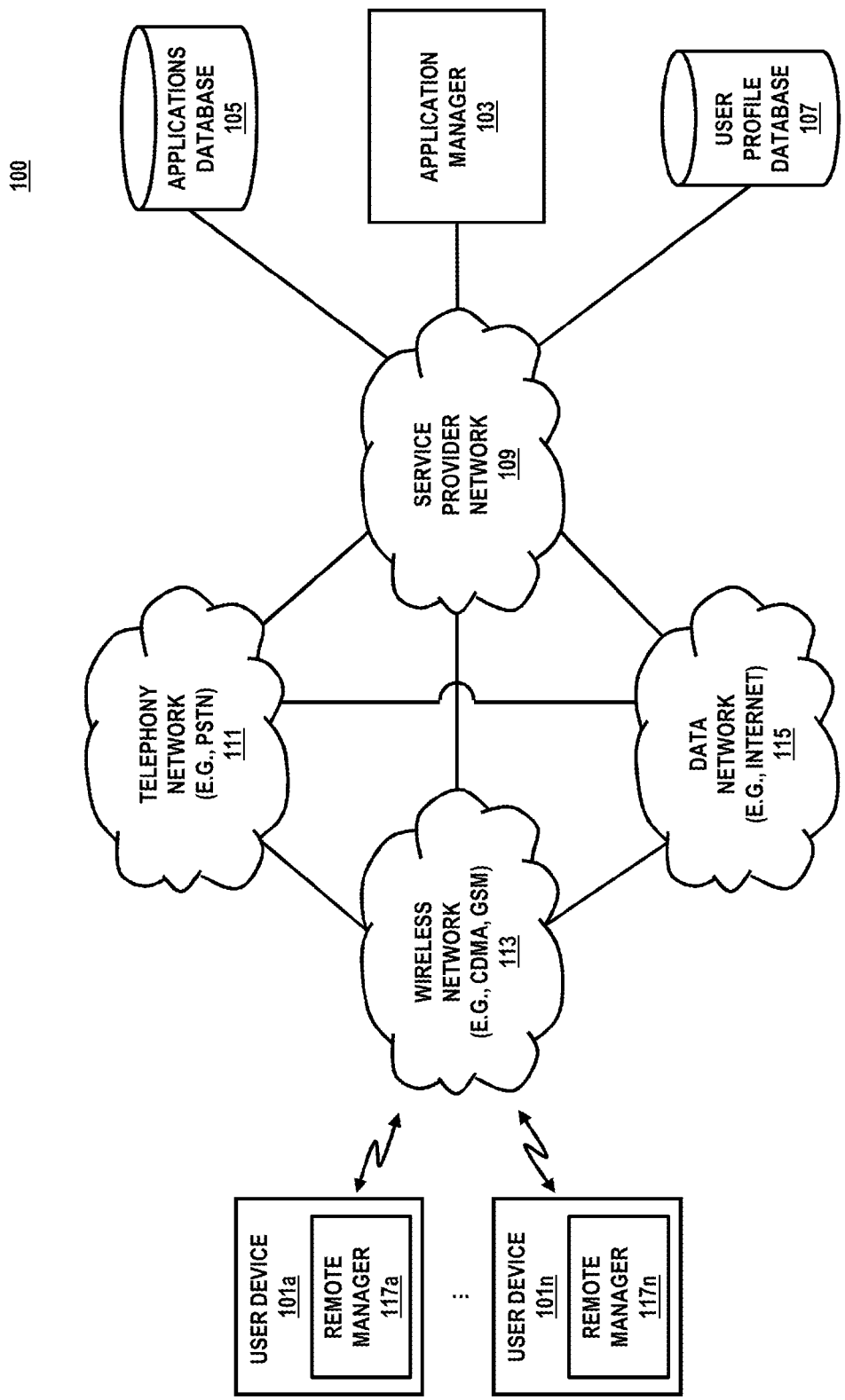
FIG. 1 is a diagram of a system capable of providing context-based application management, according to an exemplary embodiment.

FIG. 1 is a diagram of a system capable of providing application management based on context information, according to an exemplary embodiment. As discussed above, consumers often rely on recommendation services to recommend specific applications to the consumers that the consumers can use on their devices to interact with service providers. This leads to consumers often being unaware of applications that are available for their devices—even applications that are associated with service providers that the consumers are fully aware of Further, for service providers to provide additional information to consumers on their devices, consumers are often required to actively participate in the process of providing additional information by, for example, providing the service providers with contact information (e.g., email address, phone numbers, or the like). For example, to receive deals, notifications and the like, consumers often are required to provide an email address that is linked with their devices. This may sometimes cause consumers to not want additional information.

The approach of the system 100 stems, in part, from the recognition that consumers may be unaware of applications for their devices that are provided by service providers and that consumers may not want to actively participate in service providers forwarding information to the consumers regarding deals, coupons or the like.

The system 100 is able to determine context information of a user device and automatically forward one or more applications to download and install for execution on the user device based on the context information. Upon a change in the context information, the system 100 can detect the change and automatically remove or uninstall the one or more applications from the user device. Accordingly, the user can passively participate in receiving one or more applications from one or more service providers by merely satisfying certain context information associated with the one or more applications.

By way of example, a user may arrive at a specific location that is associated with a retail service provider. The retail service provider may have one or more applications associated with the system 100 to provide to users that arrive at the retail service provider's location. Upon the system 100 determining that the user has arrived at the specific location associated with the retail service provider, the system 100 may provide to the user's device an application associated with the retail service provider. Upon receiving the application, the user's device can install and run the application for the user to take advantage of services provided by the retail service provider through the application. Thus, all the user has to do is enter the specific location associated with the retail service provider. Upon the user leaving the specific location, the system 100 can detect the change in the context information indicating that the user is no longer at the specific location associated with the retail service provider. Based on the change in the context information, the system 100 may uninstall the application previously provided to the user's device and remove the application from the user's device. Based on the foregoing, the user is enticed to receive applications associated with service provider locations that the user visits to take advantage of the services provided by the application, and can be assured that their device will not become full of countless applications by having the applications removed upon leaving the locations.

In one embodiment, a user that receives an application based on the context information associated with the user's device may share the application with another user that may be at an entirely different location. By way of example, the user may receive at their device an application that includes a game that can be played with another user. For example, if a user arrives at a mechanic to have the user's car's oil changed, the user may receive on their device an application associated with the mechanic that may provide the user with information such as when their car will be ready, how much additional services may cost, deals concerning additional services, and one or more games that the user can play while the user waits for their car to be serviced. The one or more games may include the ability to play with another user. Thus, the system allows the user at the mechanic to request another user to receive the application, or at least the game associated with the application, at the other user's device, so that the two users can play the game while the user waits to have their car serviced. Upon the car being serviced and the user leaving the mechanic, the application may be removed from both users' devices based on the context information of the user who had their car serviced changing to indicate that the user is no longer at the location of the mechanic.

As shown, the system 100 includes one or more user device 101a-101n (collectively referred to as UD 101). The UD 101 may execute one or more applications. In one embodiment, each one of the UD 101 may execute a remote manager 117a-117n (collectively referred to remote manager 117). The remote manager 117 may interact with an application manager 103 for providing one or more other applications to the UD 101 based on context information of the UD 101. The application manager 103 may be implemented as, for example, part of a service provider network 109. However, in alternative embodiments, the application manager 103 could be implemented as any part of the system 100. For example, the application manager 103 and the remote manager 117 on the UD 101 may be combined into one application executed by the UD 101. The one or more applications provided to the UD 101 by the application manager 103 may come from the applications database 105. The application manager 103 may also associate the one or more UD 101 with the application manager 103 by storing user profiles for each UD 101 in the user profile database 107. The applications database 105 and/ or the user profile database 107 may be implemented as, for example, elements associated with the service provider network 109. However, in alternative embodiments, the applications database 105 and/or the user profile database 107 may be implemented as any part of the system 100. The service provider network 109 can interact with one or more other networks, such as a telephony network 111, a wireless network 113, and/or a data network 115.

For illustrative purposes, the networks 109-115 may be any suitable wireline and/or wireless network, and be managed by one or more service providers. For example, telephony network 111 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of the system 100. In this manner, networks 109-115 may embody or include portions of a signaling system 7 (SS7) network, or other suitable infrastructure to support control and signaling functions.

According to exemplary embodiments, user devices may be utilized to communicate over the system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

Figure 2:
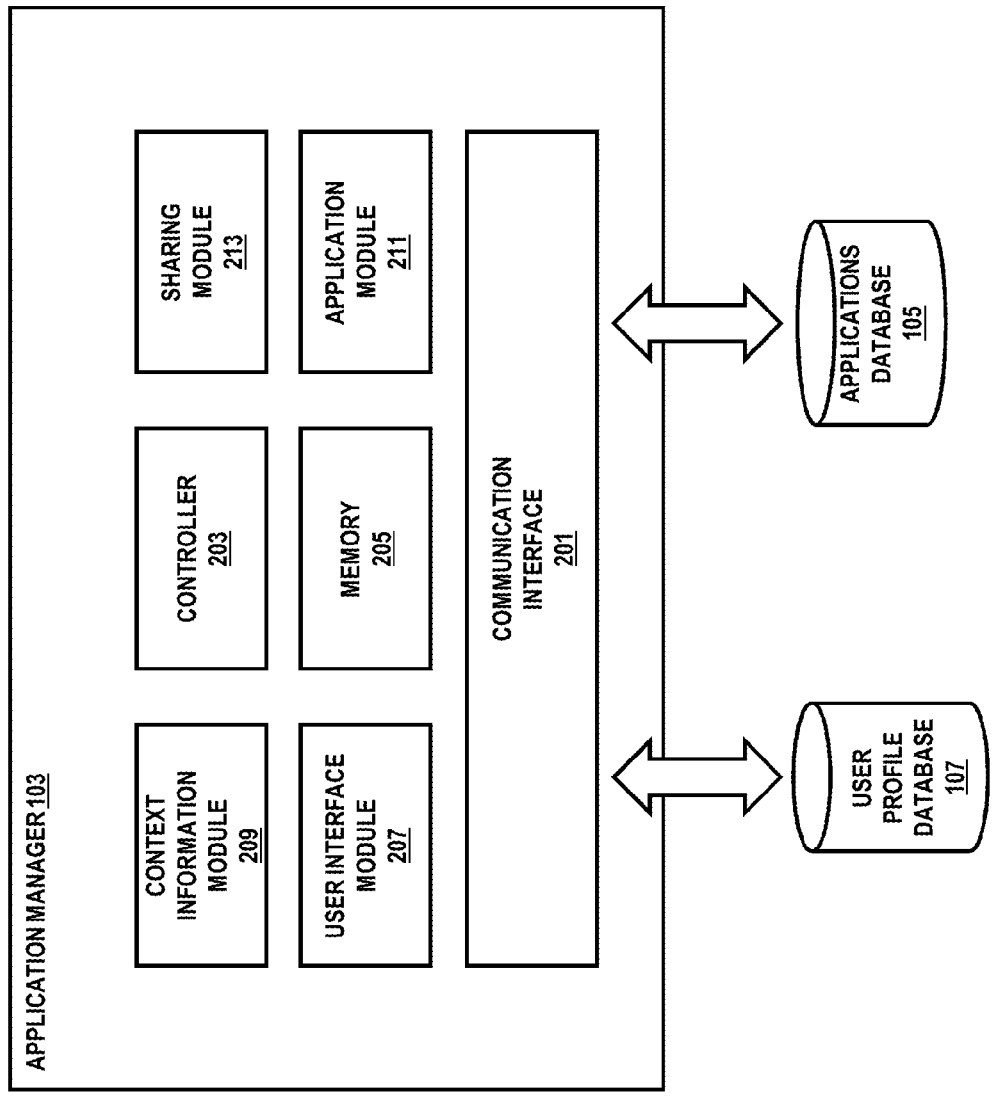
FIG. 2 is a diagram of an application manager capable of providing context-based application management, according to an exemplary embodiment.

FIG. 2 is a diagram of an embodiment of the application manager 103 used for providing applications to one or more UD 101 based on context information of the UD 101. The application manager 103 includes a communication interface 201, a controller 203, a memory 205, a user interface module 207, a context information module 209, an application module 211 and a sharing module 213.

The communication interface 201 allows the application manager 103 to communicate with the UD 101, the applications database 105, the user profile database 107 and the networks 109-115. In one embodiment, by way of example, the application manager 103 communicates with the applications database 105 to retrieve one or more applications to be sent to a UD 101 through the communication interface 201. The application manager 103 then communicates with the UD 101 to send the one or more applications to the UD 101 through the communication interface 201. In one embodiment, by way of example, the application manager 103 receives context information associated with the UD 101 through the communication interface 201. In one embodiment, by way of example, the application manager 103 communicates with a UD 101 that is not associated with the application manager 103, but is associated with a request to share an application with from another device through the communication interface 201.

The controller 203 controls the operations of the application manager 103. In one embodiment, the controller 203 is controlled by one or more sequences of one or more instructions stored on a computer-readable medium, such as the memory 205, that cause the controller 203 to control the application manager 103 to perform the various processes described herein.

The user interface module 207 determines the user interfaces that are used by the application manager 103 to interact with the user at the UD 101. In one embodiment, the application manager 103 by way of the user interface module 207 controls the user interfaces at the UD 101 for interacting with the user. However, the user interface module 207 may also be incorporated into the remote manager 117 at the UD 101. By way of example, the user interface module 207 determines the user interface associated with a user registering or associating a UD 101 with the application manager 103 for providing application management based on context information. The user interface module 207 determines the user interface associated with a UD 101 receiving an application based on the context information of the UD 101, and an application being removed from a UD 101 based on the context information of the UD 101.

The user interface module 207 also interfaces with the UD 101 to create a user profile associated with the UD 101. By way of example, the user interface module 211 initially interfaces with the UD 101 prior to a user profile being associated with the UD 101 and prompts the user of the device regarding whether the user would like to participate in the context-based application management associated with the application manager 103. If the user proceeds to associate the UD 101 with the application manager 103, the user interface module 207 creates a user profile associated with the UD 101 and stores the user profile in the user profile database 107.

The context information module 209 determines context information of the UD 101. The context information may include any information associated with the context of the UD 101 and/or the context of the user of the UD 101. For example, the context information may include the location of the UD 101, the current time, the current date, etc. The UD 101 may include one or more applications that may provide context information associated with the UD. By way of example, the UD 101 may be executing a navigation application that provides the location of the UD 101 based on triangulation of signals used by the UD 101 for communications. The UD 101 may also include one or more sensors that may provide context information associated with the UD 101. By way of example, the UD 101 may include a Global Positioning System (GPS) sensor for determining the location of the UD 101.

The context information module 209 also determines whether the context information of the UD 101 satisfies pre-defined context information. The pre-defined context information is associated with applications in the applications database 105, which are in turn associated with the service providers that created the applications for use by users on the UD 101. The pre-defined context information may include any information that can be associated with the service providers. By way of example, the pre-defined context information may include specific locations associated with the service providers, such as a movie theater. The pre-defined context information may include information regarding store hours related to the specific locations.

The context information module 209 determines whether the context information received from a UD 101 satisfies any of the pre-defined context information associated with the service providers. Upon determining that context information of a UD 101 satisfies a pre-defined context information associated with a service provider, the context information module 209 passes the information to the application module 211. After determining that the context information of a UD 101 satisfies pre-defined context information, the context information module 209 determines whether subsequent context information associated with the same UD 101 no longer satisfies the pre-defined context or satisfies different pre-defined context information. When subsequent context information associated with a UD 101 no longer satisfies the pre-defined context information, the context information module 209 passes the information to the application module 211.

By way of example, the context information associated with a UD 101 indicates that the UD 101 is at a location associated with pre-defined context information (e.g., location of a service provider). Thus, the context information module 209 indicates to the application module 211 that the UD 101 associated with a specific user profile in the user profile database 107 has satisfied the pre-defined context information (e.g., is at the specific location). When the context information associated with the UD 101 indicates the UD 101 is not longer at the location associated with the pre-defined context information (e.g., location of the service provider), the context information module 209 indicates to the application module 211 that the UD 101 associated with the specific user profile no longer satisfies the pre-defined context information (e.g., is not at the specific location).

The application module 211 interfaces with the UD 101 and/or the remote manager 117 at the UD 101 for transferring and installing applications to the UD 101 upon satisfaction of pre-defined context information. The application module 211 also interfaces with the UD 101 and/or the remote manager 117 at the UD 101 for uninstalling and removing applications at the UD 101 upon the context information of the UD 101 no longer satisfying the pre-defined context information.

By way of example, upon receiving an indication from the context information module 209 that a UD 101 associated with a profile in the user profile database 107 is at a specific location associated with an application, the application module 211 interfaces with the applications database 105 and transmits the application to the UD 101. The application module 211 also interfaces with the remote manager 117 associated with the UD 101 to have the remote manager install the application on the UD 101. Upon receiving an indication from the context information module 209 that the UD 101 associated with the profile in the user profile database 107 is no longer at the specific location associated with the application, the application module 211 interfaces with the remote manager 117 to have the application uninstalled and removed from the UD 101.

The sharing module 213 controls the sharing of applications or other information associated with applications between multiple UD 101. Requests to share an application, a part of an application, or information associated with an application (e.g., coupons or information) received by the application manager 103 are processed by the sharing module 213. By way of example, a user that received an application may request to share the application with a friend. The sharing module 213 accepts the request to share the application and interfaces with the user interface module 207, the application module 211, and user profile database 107 and/or the applications database 105 to forward the application to a UD 101 associated with the friend.

Figure 3:
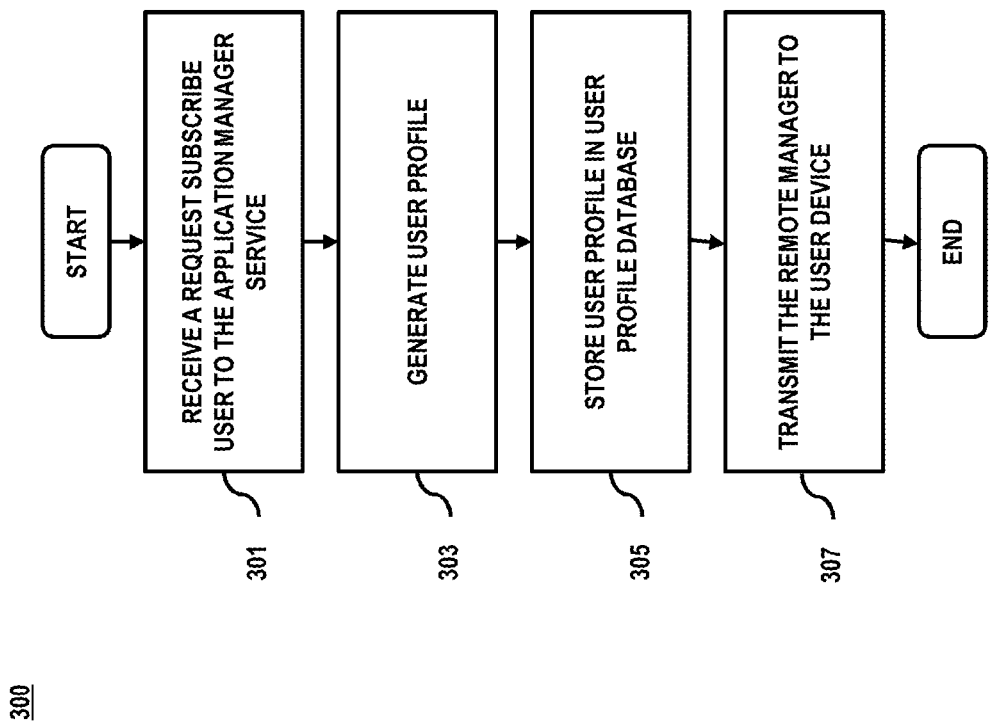
FIG. 3 is a flowchart of a process for creating a profile for providing context-based application management, according to an exemplary embodiment.

FIG. 3 is a flowchart of process 300 for associating a UD 101 with the application manager 103 that may be carried out by an embodiment illustrated in, for example, FIG. 2. In step 301, the application manager 103 receives a request from a UD 101 to associate the UD 101 with the application manager 103. In one embodiment, a user of the UD 101 may navigate to, for example, a website associated with the application manager 103 to submit a request to have the UD 101 become associated with the application manager 103. In one embodiment, the UD 101 that is not already associated with the application manager 103 may receive a request from another UD 101 to share an application using the application manager 103, and therefore receive a link to submit a request to the application manager 103. The request may include, for example, the type of service providers the user associated with the UD 101 is interested in receiving applications and information from. The request may also include the types of context information associated with the UD 101 that may be gathered for processing by the application manager 103. The request also includes information to associate the request with the UD 101.

In step 303, based on the information contained in the request, along with any identifying information regarding, for example, the UD 101, the application manager 103 generates a user profile that is associated with the UD 101. Accordingly, the application manager 103 can subsequently monitor the context information associated with the UD 101 for providing context-based application management for the UD 101. The profile associated with the UD 101 is stored in the user profile database 107, per step 305.

In step 307, the application manager 103 transmits the remote manager 117 to the UD 101 and configures the remote manager 117 to be associated with the user profile created for the UD 101. The remote manager 117 allows the UD 101 to interface with the application manager 103. In one embodiment, the application manager 103 resides on the UD 101 and, therefore, also acts as the remote manager 117.

Figure 4:
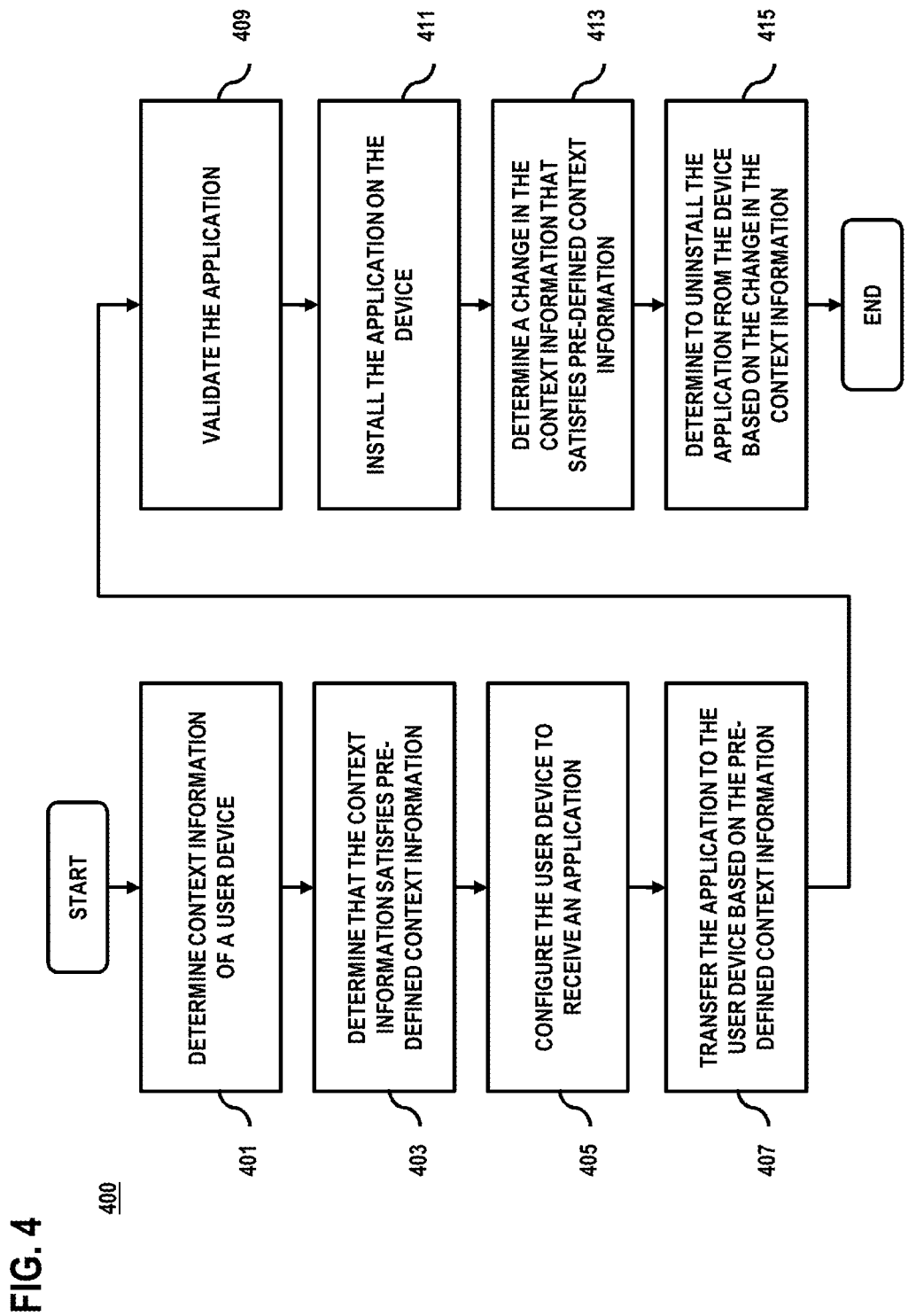
FIG. 4 is a flowchart of a process for providing context-based application management, according to an exemplary embodiment.

FIG. 4 is a flowchart of process 400 for providing context-based application management that may be carried out by an embodiment illustrated in, for example, FIG. 2. In step 401, the application manager 103 determines the context information of a UD 101. In one embodiment, the application manager 103 may determine the context information by sending a request to the UD 101 to send the current context information of the UD 101 to the application manager 103. In one embodiment, the UD 101 may constantly, periodically or, upon a change in the context information, send the context information to the application manager 103 without the application manager 103 requesting the context information. In one embodiment, the remote manager 117 running on the UD 101 may monitor the context information of the UD 101 and constantly, periodically or, upon detecting a change in the context information, send the context information to the application manager 103. The context information determined by the application manager 103 may include, for example, a location of the UD 101, a location of the user of the UD 101, a current time, or a combination thereof, or any like information regarding the context of the UD 101 or the user of the UD 101.

After determining the context information of the UD 101, the application manager 103 continues determining the context information of the UD 101 throughout the remainder of the process 400 to determine, for example, subsequent changes in the context information of the UD 101. The application manager 103 can continue to determine the context information of the UD 101 according to the same approach used to initially determine the context information, or according to a different approach. For example, after initially determining the context information based on the application manager 103 requesting the remote manager 117 to transmit the context information of the UD 101, the subsequent context information may be determined by the application manager 103 upon the remote manager 117 determining a change in the context information and transmitting the change in the context information to the application manager 103.

In step 403, the application manager 103 determines that the context information of the UD 101 satisfies pre-defined context information. After determining the context information of the UD 101, the application manager 103 may constantly, periodically, or, upon detecting a change in the context information, compare the context information to pre-defined context information. The pre-defined context information may include, for example, location information, time information, or a combination thereof. For example, the context information of the UD 101 may indicate that the UD 101 is currently at a location (e.g., a retail location, such as a movie theater) that corresponds to a pre-defined location (e.g., the retail location).

In step 405, the application manager 103 may configure the UD 101 to receive an application that is associated with the pre-defined context information that is, in turn, associated with, for example, a specific location. In one embodiment, the application manager 103 configures the UD 101 to download the application from using a radio area network (RAN). In one embodiment, the application manager 103 configures the UD 101 to download the application from a local area network associated with the specific location. By way of example, if the pre-defined context information is associated with a retail location that includes a local area network (e.g., WiFi), the application manager 103 may configure the UD 101 to join the local area network to download the application associated with the retail location. In one embodiment, the application manager 103 interfaces with the remote manager 117 associated with the UD 101 to configure the UD 101 to download the application.

In step 407, the application manager 103 transfers the application associated with the pre-defined context information to the UD 101. In one embodiment, the application manager 103 interfaces with the applications database 105 to obtain the application and transfer the application to the remote manager 117 associated with the UD 101.

In step 409, the application manager 103, the remote manager 117, or a combination thereof validates the application received at the UD 101 to verify that the UD 101 received the correct application and that the application was not corrupted during the transfer process. By way of example, the application manager 103 validates the application to verify that the application was not intercepted by a third party and modified. Then, in step 411, the application manager 103, the remote manager 117, or a combination thereof installs the application on the UD 101. By way of example, upon validating the application, the application manager 103 instructs the remote manager 117 to install the application on the UD 101.

In step 413, as discussed above, the application manager 103 continues determining the context information of the UD 101 and determines that the context information of the UD 101 no longer satisfies the pre-defined context information, or that the context information of the UD 101 satisfies other pre-defined context information. Similar to step 403, after determining the context information of the UD 101, the application manager 103 may constantly, periodically, or, upon detecting a change in the context information, compare the context information to the same or other pre-defined context information. As discussed above, the pre-defined context information may include, for example, location information, time information, or a combination thereof. For example, the context information of the UD 101 may indicate that the UD 101 has left the location (e.g., the retail location) discussed above that corresponds to the initial pre-defined context information (e.g., the retail location).

In step 415, the application manager 103 determines to uninstall the application transferred and installed in steps 407 and 411, respectively, based on the change in the context information of the UD 101. By way of example, because the user exited the retail location that triggered installation of the application, the user no longer needs the application on the UD 101. In which case, the application manager 103 determines to uninstall the application from the UD 101 so that the UD 101 does not become full of applications that the user of the UD 101 does not want on the UD 101. In one embodiment, prior to uninstalling the application, the application manager 103 may prompt the user of the UD 101 whether the user would like for the application manager 103 to remove the application or leave the application installed on the UD 101. In this case, if the user enjoyed using the application, for example, the user has the ability to keep the application on the UD 101 despite leaving, for example, the retail location associated with the application. As shown, the process 400 may revert back to step 401 and continue monitoring the context information of the UD 101 to determine whether the context information satisfies additional pre-defined context information.

Figure 5:
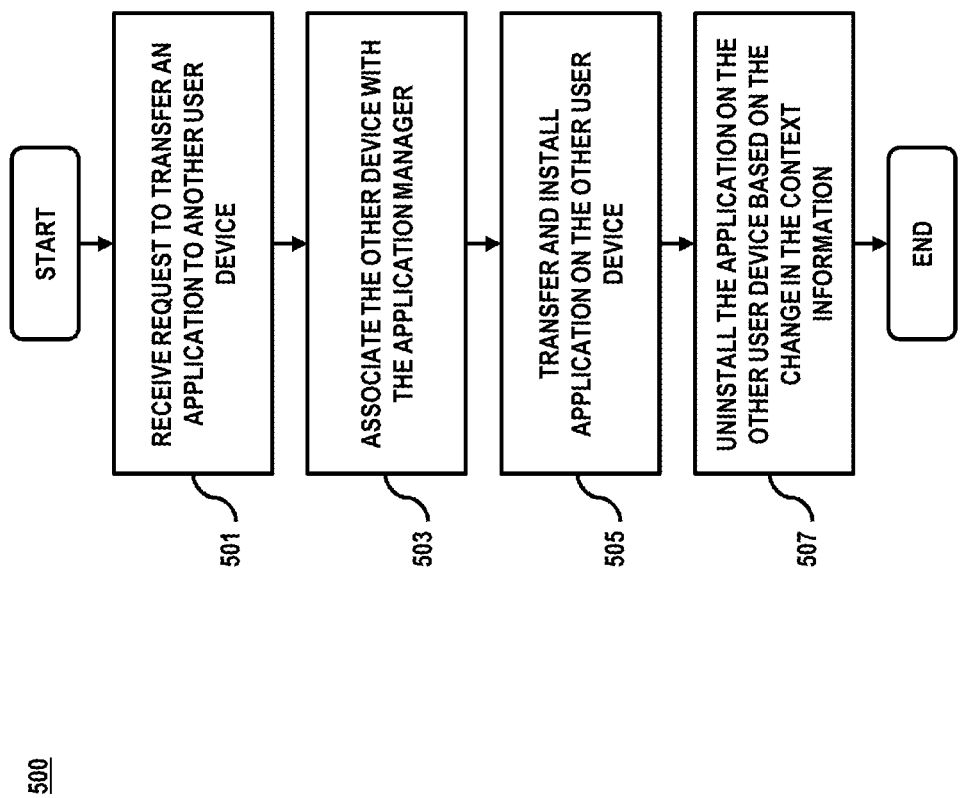
FIG. 5 is a flowchart of a process for transferring an application to another user device, according to an exemplary embodiment.

FIG. 5 is a flowchart of a process 500 for sharing an application between multiple UD 101 that may be carried out by an embodiment illustrated in, for example, FIG. 2. In step 501, the application manager 103 receives a request from a UD 101a to share an application with a UD 101n. By way of example, an application transferred to a UD 101a based on the context information of the UD 101a may constitute or include a two-person game. For example, a user may receive an application while at their doctor's office for a consultation and the application may include a game for the user to play. Thus, the user associated with the UD 101a can share the application with another user associated with UD 101n to play the game together.

In step 503, the application manager 103 associates the other device (e.g., the UD 101n) with the application originally transferred to the UD 101a. In one embodiment, the application manager 103 determines whether a profile has been created that is associated with the UD 101n to determine whether the UD 101n has the remote manager 117. The application manager 103 may search the user profile database 107 to locate the UD 101n to determine if the UD 101n is already associated with the application manager 103. If the UD 101n does not have a profile associated with the application manager 103 and/or does not have the remote manager 117 running, the application manager 103 proceeds to execute the process 300 discussed above to create a user profile associated with the UD 101n and to transfer the remote manager 117 to the UD 101n. Upon creating a profile for the UD 101n or loading the remote manager 117 on the UD 101n, the application manager 103 associates the UD 101n with the application manager 103 and the application that the UD 101a requested to share with the UD 101n.

In step 505, the application manager 103 transfers and installs the application on the UD 101n as discussed above with respect to FIG. 4. In one embodiment, the application manager 103, the remote manager 117 running on the UD 101n, or a combination thereof also validate the transferred application to ensure that the application has not been corrupted. The other user associated with the UD 101n can then enjoy the application (e.g., the two-person game) with the user of the UD 101a.

In step 507, upon the application manager 103 determining that the context information of the UD 101a changed, as described with respect to process 400 above, the application manager 103 or the remote manager 117 on the UD 101n determines to uninstall and remove the application on the UD 101n. By way of example, when the user associated with UD 101a leaves the location that triggered transferring the application to the UD 101a, the application is uninstalled and removed from the UD 101a and, therefore, also uninstalled and removed from the UD 101n because the second user no longer needs the application, regardless of whether the context information of the second user changed. After step 507, the process 500 ends.

Figure 6C:
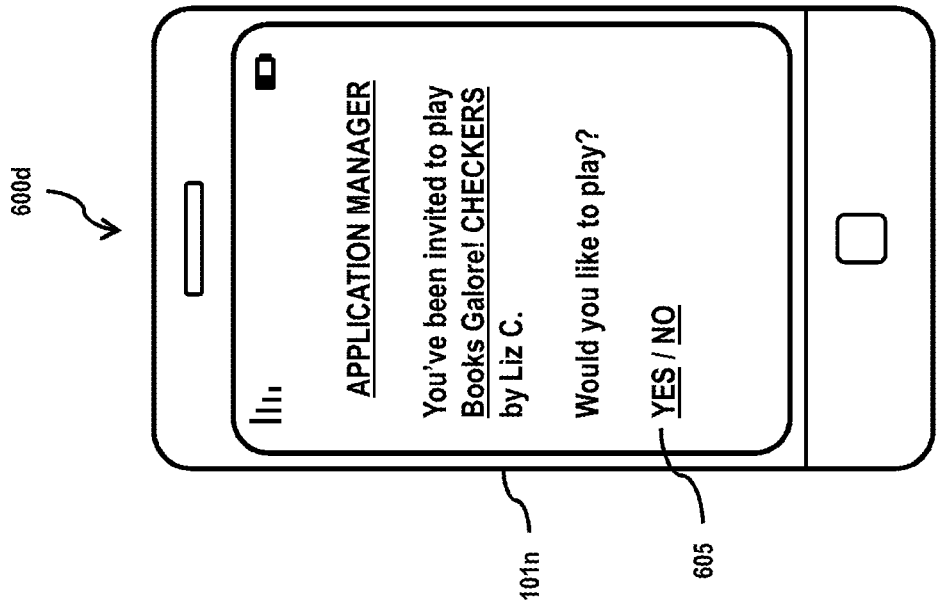

FIGS. 6A to 6F are diagrams of user interfaces used in executing the processes of FIGS. 3 to 5, according to exemplary embodiments. FIG. 6A illustrates the user interface 600a after an application is installed on the UD 101a based on the context information of the UD 101a satisfying pre-defined context information. By way of example, the user interface 600a may include text describing the newly installed application, such as the text illustrated in FIG. 6A that describes the newly installed application and includes information regarding the service provider that is associated with the application. As illustrated in FIG. 6A, the service provider associated with the application is, e.g., "Books Galore!" The user interface 600a may include one or more indicators 603b and 603c of applications already installed on the UD 101a and indicator 603a of the application that was newly installed based on the context information of the UD 101a satisfying the pre-defined context information associated with the application for the service provider Books Galore!

FIG. 6B illustrates the user interface 600b after an application is uninstalled from the UD 101a when the context information of the UD 101a changed to no longer satisfy the pre-defined context information or to satisfy other pre-defined context information. By way of example, the Books Galore! application is uninstalled when the context information of the UD 101a indicates that the UD 101a is no longer near the Books Galore! retail location. The user interface 600b includes information describing that the Books Galore! application was uninstalled from the UD 101a.

FIG. 6C illustrates the user interface 600c associated with the user of the UD 101a when the user of the UD 101a requests to share an application transferred to the UD 101a based on the context information of the UD 101a to another UD 101. By way of example, the Books Galore! application includes a game of checkers that can be played against another user. The user interface 600c allows the user of the UD 101a to enter information (e.g., cell phone number, e-mail address, or the like) to associate the application with another user device (e.g., UD 101n).

Figure 6D:
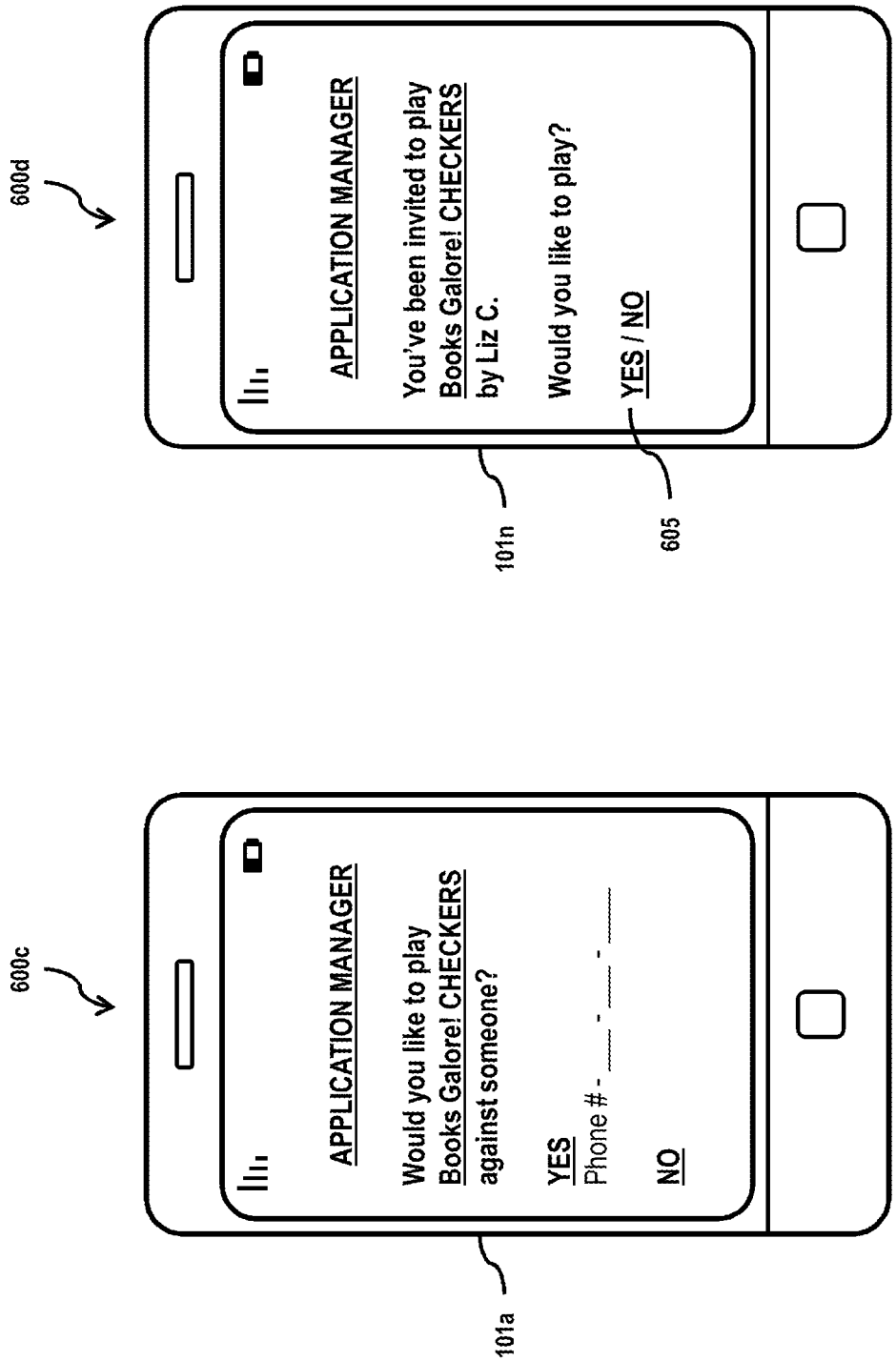

FIG. 6D illustrates the user interface 600d associated with the UD 101n receiving an invitation to play Books Galore! Checkers against the user associated with UD 101a (e.g., Liz C.). The user interface 600d includes indicator 605 that allows the user of the UD 101n to select whether or not to accept the invitation by Liz C. to play Books Galore! Checkers.

Figure 6F:
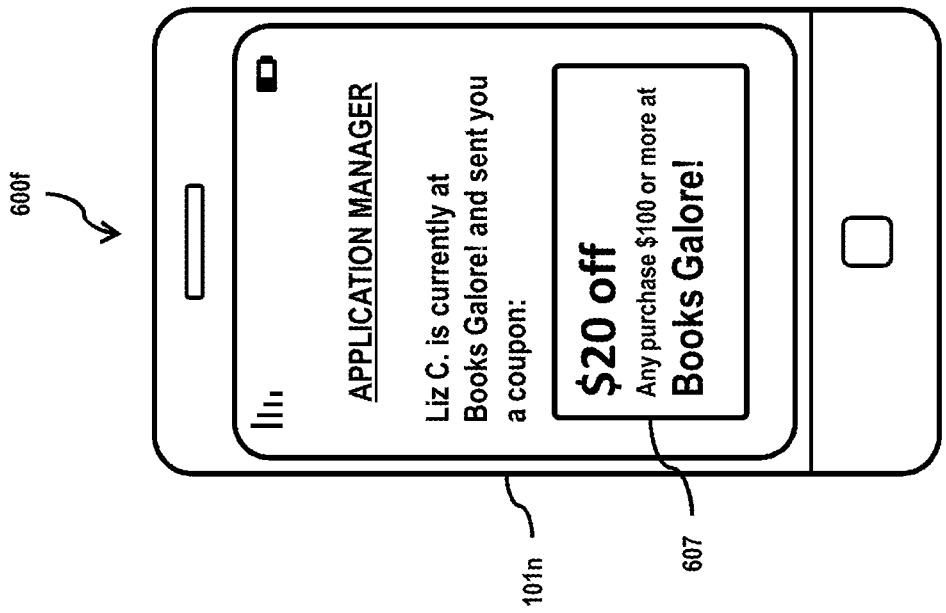
Figure 6E:
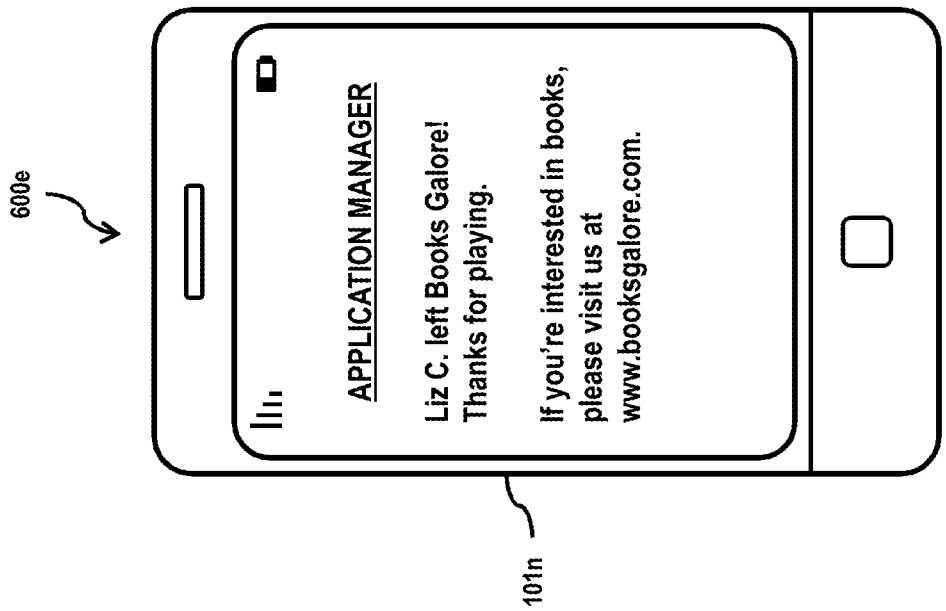

FIG. 6E illustrates the user interface 600e of the UD 101n when the UD 101a that transferred the shared application to the UD 101n no longer satisfies the pre-defined context information or satisfies other pre-defined context information such that the application is uninstalled from the UD 101a. Upon the application being uninstalled from the UD 101a, the application is also uninstalled from the UD 101n. The user interface 600e includes information explaining, for example, why the application is being uninstalled from the UD 101n. The information can also include advertisements for the service provider associated with the application, such as the service provider's website.

FIG. 6F illustrates the user interface 600f of the UD 101n when the user of the UD 101a attempts to share other information associated with the application downloaded based on the context information of the UD 101a. By way of example, the application downloaded to the UD 101a may include coupons that the user of the UD 101a may share with other users. Thus, instead of sharing the application itself, the user of the UD 101a may share the other information. In one embodiment, the other information may include, for example, advertisements, deals, coupons or the like. By way of example, FIG. 6F illustrates the user of the UD 101a sharing with the UD 101n a coupon for $20 off at Books Galore!

The processes described herein for providing context-based application management may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
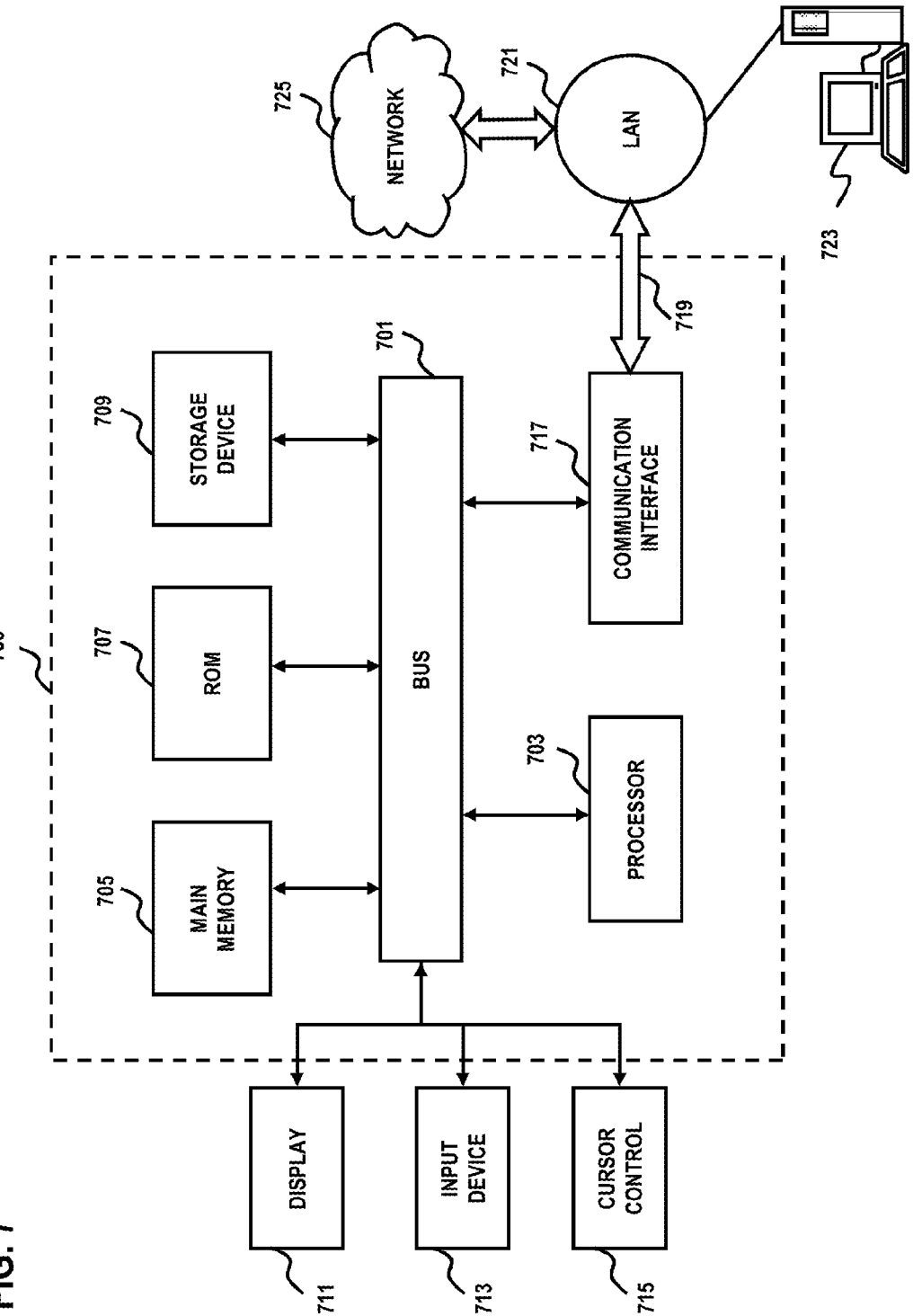
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
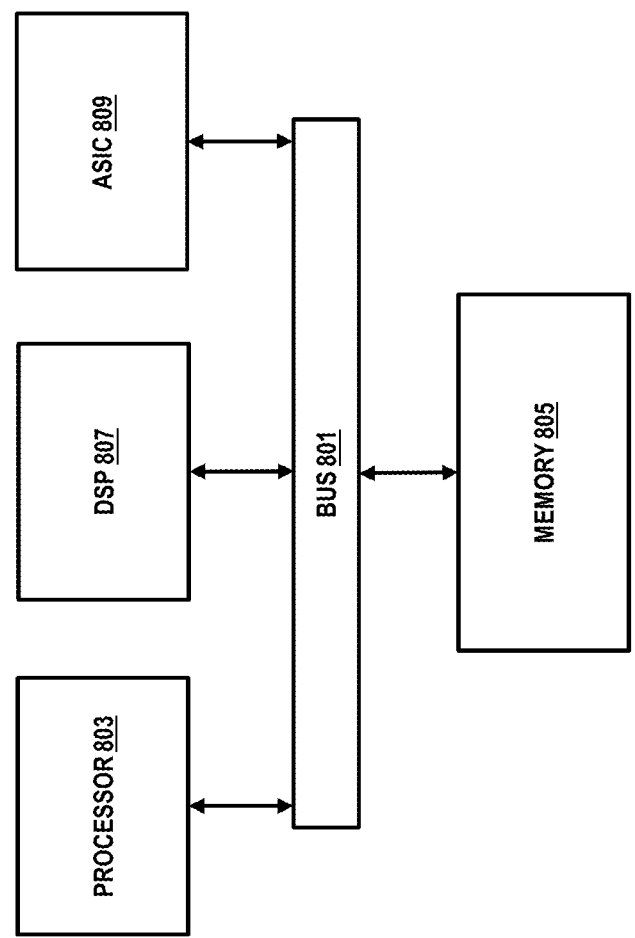
FIG. 8 is a diagram of a chip set that can be used to implement various exemplary embodiments.

FIG. 8 illustrates a chip set 800 upon which an embodiment of the invention may be implemented. Chip set 800 is programmed to present a slideshow as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 3-5.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    initiating, by an apparatus controlled by a retail service provider, installation of a remote manager application on a user device;
    determining by the apparatus via the remote manager application that current context information of the user device satisfies pre-defined context information, the pre-defined context information indicating one or more retail locations associated with the retail service provider and a time range associated with the one or more retail locations;
    initiating by the apparatus a transfer of an application to the user device based on the pre-defined context information and the satisfaction of the pre-defined context information;
    initiating by the apparatus a validation of the application by the remote manager application that the application is not corrupted, intercepted, modified, or a combination thereof, by a third party during the transfer, prior to the installation of the application;
    initiating by the apparatus via the remote manager application installation of the application at the user device based on the validation;
    causing, at least in part by the apparatus, transfer of the application to another user device based on a request from the user device;
    initiating by the apparatus installation of the application on the other user device; and
    initiating uninstallation of the application by the apparatus from the other user device based on at least one change in the current context information of the user device that causes dissatisfaction of the pre-defined context information as determined by the remote manager application, wherein the at least one change in the current context information of the user device indicates an uninstallation of the application from the user device.

2. A method according to claim 1, further comprising:
    transferring the application to the user device based on the current context information.

3. A method according to claim 2, further comprising:
    determining a local data network configured to transfer the application to the user device based on a current location indicated in the current context information; and
    determining to configure the user device to connect to the local data network to download the application,
    wherein the application is downloaded to the user device over the local data network.

4. A method according to claim 2, further comprising:
    determining to uninstall the application on the user device based on a change of a current time indicated in the current context information outside of the time range,
    wherein the application is pushed to the user device.

5. A method of according to claim 1, further comprising:
    determining by the apparatus whether the user device has installed with the remote manager application, wherein the remote manager application is installed on the user device when the apparatus determines that the user device has not yet installed with the remote manager application.

6. A method according to claim 1, further comprising:
initiating a presentation on the user device indicating the at least one change in the current context information of the user device and a prompt querying whether to remove the application from the user device or leave the application on the user device prior to the initiating of the uninstallation from the user device; and
skipping the initiating of the uninstallation from the user device, when receiving a user selection of leaving the application on the user device.

7. A method according to claim 1, wherein the application includes a gaming application,
wherein the other user device is connected with the user device via a near field communication network.

8. A method according to claim 1, further comprising:
sharing information associated with the application with another user device based on a request from the user device, a user of the user device, or a combination thereof,
wherein the current context information comprises a location of the user device, and the other user device is located away from the location of the user device.

9. A method according to claim 8, wherein the information comprises a coupon, an advertisement, a website address, an email address, a street address, a telephone number, or a combination thereof.

10. A method of claim 5, further comprising:
determining by the apparatus whether a profile has been created for the user device to determine whether the user device has installed with the remote manager application,
wherein the application is selected based on user preference, a past user selection, the current context information, or a combination thereof, and the application is transferred from the user device to the other user device.

11. An apparatus controlled by a retail service provider comprising:
a processor configured to:
initiate installation of a remote manager application on a user device,
determine via the remote manager application that current context information of the user device satisfies pre-defined context information, the pre-defined context information indicating one or more retail locations associated with the retail service provider and a time range associated with the one or more retail locations,
initiate a transfer of an application to the user device based on the pre-defined context information and the satisfaction of the pre-defined context information,
initiate a validation of the application by the remote manager application that the application is not corrupted, intercepted, modified, or a combination thereof, by a third party during the transfer, prior to the installation of the application,
initiate via the remote manager application installation of the application at the user device based on the validation,
cause, at least in part, a transfer of the application to another user device based on a request from the user device, initiate installation of the application on the other user device, and
initiate uninstallation of the application from the other user device based on at least one change in the current context information of the user device that causes dissatisfaction of the pre-defined context information as determined by the remote manager application, wherein the at least one change in the current context information of the user device indicates an uninstallation of the application from the user device.

12. An apparatus according to claim 11, further comprising:
a communication interface configured to transfer the application to the user device based on the current context information.

13. An apparatus according to claim 11, wherein the processor is further configured to:
determine a local data network configured to transfer the application to the user device based on a current location indicated in the current context information; and
determine to configure the user device to connect to the local data network, and the application is transferred to the user device over the local data network.

14. An apparatus according to claim 12, wherein the application is pushed to the user device.

15. An apparatus according to claim 11, wherein the processor is further configured to determine whether the user device has installed with the remote manager application, wherein the remote manager application is installed on the user device when the apparatus determines that the user device has not yet installed with the remote manager application.

16. An apparatus according to claim 11, wherein the processor is further configured to initiate a presentation on the user device indicating the at least one change in the current context information of the user device and a prompt querying whether to remove the application from the user device or leave the application on the user device prior to the initiating of the uninstallation from the user device; and skip the initiating of the uninstallation from the user device, when receiving a user selection of leaving the application on the user device.

17. An apparatus according to claim 11, wherein the application includes a gaming application, and wherein the other user device is connected with the user device via a near field communication network.

18. An apparatus according to claim 11, wherein the processor is further configured to share information associated with the application with another user device based on a request from the user device, the user of the user device, or a combination thereof, wherein the current context information comprises a location of the user device, and the other user device is located away from the location of the user device.

19. An apparatus according to claim 18, wherein the information comprises a coupon, an advertisement, a website address, an email address, a street address, a telephone number, or a combination thereof.

20. An apparatus according to claim 11, wherein the application comprises at least one recommended application selected based on user preference, a past user selection, the current context information, or a combination thereof.

* * * * *